United States Patent Office.

GEORGE WAKEFIELD FOX, OF MANCHESTER, GREAT BRITAIN.

Letters Patent No. 107,244, dated September 13, 1870.

IMPROVED MANNER OF TREATING COD-LIVER AND CASTOR-OILS.

The Schedule referred to in these Letters Patent and making part of the same.

I, GEORGE WAKEFIELD FOX, of Manchester, in the county of Lancaster, Kingdom of Great Britain, have invented a new and Improved Method of Treating or Preparing Cod-liver and Castor-Oils, in order to render them more palatable.

Nature and Objects of the Invention.

The object of my invention is to neutralize or disguise the nauseous properties of cod-liver oil and castor-oil, and thereby to render the same more palatable. For this purpose I mix with the oil a sweet sirup made from honey, sugar, malt, some descriptions of fruit, or from other sacchariferous materials capable of yielding a sweet and wholesome sirup; and I also mix therewith a portion of fruit or vegetable acid, as for example, citric acid, tartaric acid, lemon-juice or lime-juice; and I also mix therewith such an aromatic essential oil, tincture, or essence, as will impart to the mixture an agreeable flavor, as for example, of lemon, citron, orange, cinnamon, cloves, aniseseed, peppermint, or almond; or I use artificial preparations, such as the artificial essence of pineapple.

When selecting any of the materials indicated above, I prefer to use such as will be wholesome, and will not interfere with the beneficial action of the oil, or as are considered to have a beneficial action on the human system.

The proportions of the various ingredients may be varied to suit different tastes, and, when preparing a mixture specially adapted for infants, a larger proportion of sweet sirup and a smaller proportion of acid may be used than when preparing a mixture for adults.

The proportions of ingredients in a preparation suitable for general use, may be as follows, namely:

Four ounces of sweet sirup of sugar.
Ten grains of citric acid or tartaric acid.
Fifteen drops of essence of lemon or of citron.
Four ounces of cod-liver oil or castor-oil, as the case may be.

The several ingredients are added together, and are mixed by simple agitation, either in the bottles in which the mixture is to be sold, or otherwise, as may be desired.

In the case of castor oil I sometimes leave out the acid. It may be desirable, in order to render the mixture more palatable, to use two or more varieties of sweet sirup, acid, or flavoring matter in combination with the oil.

When preparing the mixture for sale, I put it up in colored bottles, each bottle bearing the words "Palatable castor-oil" or "Palatable cod-liver oil," as the case may be.

Claim.

I claim as my invention—

The method of rendering cod-liver and castor-oils palatable, by the addition thereto or the admixture therewith of the ingredients herein described, substantially as set forth.

Witnesses:    GEORGE WAKEFIELD FOX.
    EDWARD K. DUTTON,
    HUGH G. GRANT.